(12) United States Patent
Kang et al.

(10) Patent No.: US 9,344,480 B2
(45) Date of Patent: May 17, 2016

(54) METHOD OF PROVIDING WIRELESS DATA COMMUNICATION SERVICE USING IP AND APPARATUS THEREOF

(75) Inventors: Hyeon Jin Kang, Seoul (KR); Sang Jun Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 13/143,267

(22) PCT Filed: Jan. 6, 2010

(86) PCT No.: PCT/KR2010/000067
§ 371 (c)(1),
(2), (4) Date: Jul. 5, 2011

(87) PCT Pub. No.: WO2010/079950
PCT Pub. Date: Jul. 15, 2010

(65) Prior Publication Data
US 2011/0276676 A1 Nov. 10, 2011

(30) Foreign Application Priority Data
Jan. 8, 2009 (KR) .................. 10-2009-0001546

(51) Int. Cl.
*G06F 15/173* (2006.01)
*H04L 29/08* (2006.01)
*H04L 29/06* (2006.01)
*H04W 4/00* (2009.01)
*H04W 80/02* (2009.01)

(52) U.S. Cl.
CPC ............... *H04L 67/04* (2013.01); *H04L 69/24* (2013.01); *H04L 69/321* (2013.01); *H04W 4/003* (2013.01); *H04W 80/02* (2013.01)

(58) Field of Classification Search
CPC ............... H04L 69/24; H04L 65/0531; H04L 29/06537; H04L 63/205; H04L 69/18; H04L 69/32; H04M 1/2471; H04M 1/72563; H04W 36/32; H04B 1/3805
USPC .......... 709/227, 228, 220; 358/1.15; 370/338, 370/464, 328
See application file for complete search history.

(56) References Cited

U.S. PATENT DOCUMENTS

| | | | |
|---|---|---|---|
| 6,393,476 B1 * | 5/2002 | Barnhouse et al. | 709/223 |
| 6,658,465 B1 * | 12/2003 | Touboul | 709/223 |
| 6,813,503 B1 * | 11/2004 | Zillikens et al. | 455/457 |
| 7,039,712 B2 * | 5/2006 | Valavi et al. | 709/228 |
| 7,340,518 B1 * | 3/2008 | Jenkins | 709/225 |
| 7,983,218 B2 * | 7/2011 | Kesavan et al. | 370/331 |

(Continued)

FOREIGN PATENT DOCUMENTS

| | | |
|---|---|---|
| EP | 1976228 A1 | 10/2008 |
| JP | 2001-223760 A | 8/2001 |

(Continued)

*Primary Examiner* — Dustin Nguyen
(74) *Attorney, Agent, or Firm* — Jefferson IP Law, LLP

(57) ABSTRACT

Disclosed is an apparatus for providing a wireless data communication service using Internet protocol. The apparatus includes a connection manager (CM) which periodically receives network information from a base station, and updates and stores the received network information; and an application unit which receives preset network information according to each application among the network information from the connection manager, and performs a function according to each application.

10 Claims, 3 Drawing Sheets

(56) References Cited

U.S. PATENT DOCUMENTS

| | | |
|---|---|---|
| 2002/0194325 A1 | 12/2002 | Chmaytelli et al. |
| 2005/0276240 A1* | 12/2005 | Gupta et al. ............... 370/328 |
| 2005/0282559 A1* | 12/2005 | Erskine et al. ............ 455/456.4 |
| 2006/0277275 A1* | 12/2006 | Glaenzer .................... 709/219 |
| 2007/0104166 A1* | 5/2007 | Rahman et al. ............ 370/338 |
| 2008/0004025 A1* | 1/2008 | Lee .............................. 455/437 |
| 2008/0080411 A1* | 4/2008 | Cole ............................ 370/328 |
| 2008/0113665 A1* | 5/2008 | Paas et al. ................ 455/426.1 |
| 2009/0097062 A1* | 4/2009 | Hayashi ..................... 358/1.15 |
| 2009/0168800 A1* | 7/2009 | Leinonen et al. ............ 370/464 |
| 2009/0210537 A1* | 8/2009 | Irwin et al. ................... 709/227 |
| 2010/0131619 A1* | 5/2010 | Brewis et al. ................ 709/220 |

FOREIGN PATENT DOCUMENTS

| | | |
|---|---|---|
| KR | 10-2008-0069560 A | 7/2008 |
| WO | 2004-049638 A2 | 6/2004 |
| WO | 2008-011607 A2 | 1/2008 |

\* cited by examiner

METHOD OF PROVIDING WIRELESS DATA COMMUNICATION SERVICE USING IP AND APPARATUS THEREOF

TECHNICAL FIELD

The present invention relates to a method and apparatus for providing a wireless data communication service, more particularly, to a method and apparatus for providing a wireless data communication service by utilizing network information in a wireless data communication service that uses IP (Internet protocol).

BACKGROUND ART

An IP (Internet protocol) connection service is moving from a wired service to a wireless service. Particularly, a charged wireless IP service provides a terminal state check (a UICC card reader check and a network interface card check), authentication information confirmation of UICC and authentication procedure performance in the initial service connection, and a network connection profile selection function, using an Internet connection service application which is named a connection manager (CM), and provides user with information such as service hour and the amount of packet used. In addition, the charged wireless IP service provides a developer with more detailed information (cell ID and sector index or the like) than information provided to general user by having a separate debugging mode. A USI (universal service interface) is a service delivery platform that provides a single interface (U1) for providing information that can be provided by a network operator to a contents provider. An agent is an application which is separately installed in a user client in order to be provided information that cannot be directly obtained by a user application or service from an operator or another source. As mentioned above, the connection manager (CM) manages connection and authentication, connection-related environment setting and an environment profile in a charged wireless IP access service, and provides detailed network information which is necessary for a developer by having a separate debugging mode. Above all, the CM has more network information than any other user application, the network information which can be obtained in subscriber terminal's position. An application using an existing network parameter or an SOA (service-oriented architecture) application cannot recognize characteristics of a corresponding IP connection.

Hence, a separate connection with an operator or a contents provider is necessary to obtain network information (a network parameter), and other user applications cannot utilize network information that the connection manager (CM) already has. That is, the existing CM does not have a separate method for providing network information that the CM has to another application, and in order for a third party application to utilize network information, a separate agent needs to be installed to utilize information provided by an agent, or as mentioned above, a separate connection with an operator or a contents provider is needed.

Installing a separate application for an additional function provided by an application can make user feel uncomfortable. In addition, if each different application has to obtain network information through its own agent or connection, user would feel burdened in using such a service, client and operator resources are wasted, and the service can be delayed because continuous information update through communication with an operator network is required.

DISCLOSURE OF INVENTION

Technical Problem

The present invention is made in view of the above problems, and provides a method and apparatus for providing a wireless data communication service using Internet protocol, which is capable of providing network information that a connection manager positioned within a client has and information that can be provided from an operator network in a unified manner without applying a SDP (service delivery platform) such as OMA, USI (universal service interface) and Parlay to applications that provide a wireless data communication service or without an additional connection to the outside of the client.

The present invention further provides a method and apparatus for providing a wireless data communication service using Internet protocol by making use of network information and information that applications providing a wireless data communication service can receive from an operator network.

Solution to Problem

In order to accomplish the object, an apparatus for providing a wireless data communication service using Internet protocol according to an embodiment of the present includes: a connection manager (CM) which periodically receives network information from a base station, and updates and stores the received network information; and an application unit which receives preset network information according to each application among the network information from the connection manager, and performs a function according to each application.

Advantageous Effects of Invention

According to the present invention, network information that a connection manager (CM)already has can be provided to applications in a unified manner without a separate connection to the outside.

Additionally, the quality of a wireless data communication service can be improved by executing an application using the above-mentioned network information.

MODE FOR THE INVENTION

Firstly, a configuration of a wireless data communication system using Internet protocol (IP) according to an exemplary embodiment of the present invention will be explained.

Figure 1:
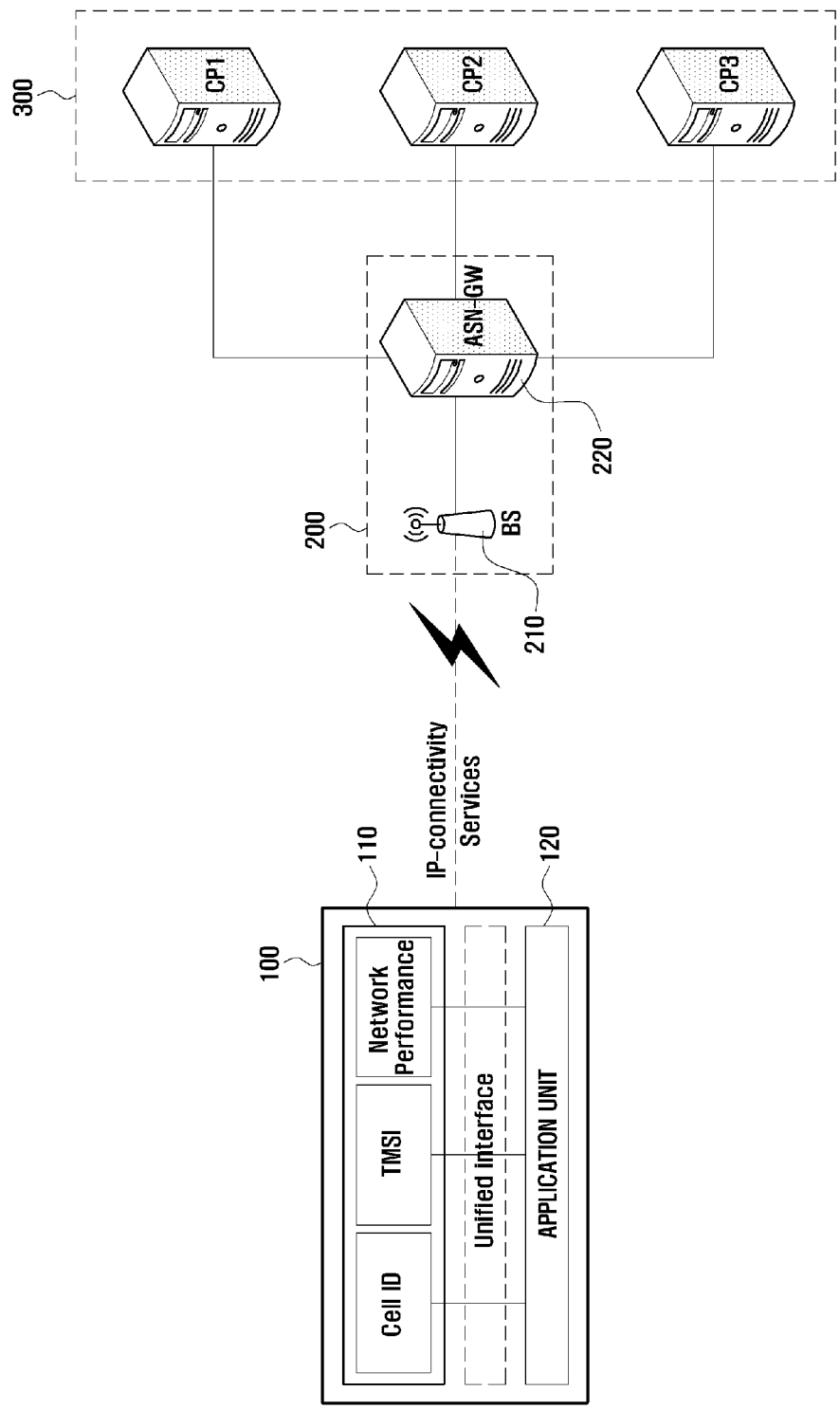
FIG. 1 illustrates a configuration of a wireless data communication system according to an exemplary embodiment of the present invention.

FIG. 1 illustrates a configuration of a wireless data communication system according to an exemplary embodiment of the present invention.

Referring to FIG. 1, a wireless communication system according to an exemplary embodiment of the present invention includes a user terminal 100, an operator 200 which provides a wireless data service to subscriber terminals, and a contents provider 300 which provides contents of a wireless data service through the operator 200.

The user terminal 100 includes a connection manager (CM) 110 which manages wireless connection and an application unit 120 which provides a wireless data service to user through wireless connection by the setting of the connection manager 110.

The connection manager (CM) 110 stores network information including a base station identifier, location information that converted a base station identifier, identification information for identifying a subscriber or a subscriber terminal, and performance information which is information about performance of a terminal and performance of wireless data communication.

The identification information can be a terminal identifier or a subscriber identifier for identifying a terminal or a subscriber. Such identification information can be IMEI(International Mobile Equipment Identity), IMSI(International Mobile Subscriber Identity), and TMSI(or TIMSI: Temporary IMSI).

The IMEI is a 15-digit digital code, and is information for identifying each subscriber terminal. The IMSI is a 15-digit digital code, and is information for identifying each subscriber. In addition, the TMSI is a pseudo-random number, is a temporary identifier generated from the IMSI, and is used to identify each subscriber.

The base station identifier used as location information can be a BSID (Base Station Identity) for identifying a base station to which the current terminal is connected. The connection manager 110 can convert such a base station identifier into location information, and can provide the location information to the application unit 120.

The performance information includes information of performance of a terminal which includes the calculation processing ability of the terminal, the resolution of the terminal, and the graphic acceleration ability of the terminal, and performance information of wireless data communication which includes bandwidth, RSSI, CINR and QoS.

The application unit 120 is a set of various applications, and provides a service according to each application. Such applications include a messenger, a DRM contents player, a camera application, and a multimedia stream player.

Particularly, the application unit 120 according to an exemplary embodiment of the present invention extracts network information that is set in advance for each application from the connection manager (CM) 110, and provides a service according to a corresponding application to user using the extracted network information.

When the CM provides network information to a user application, the communication between the CM and the user application and network information protection of the CM can be performed by the following method.

The connection manager (CM) 110 and the application unit 120 exchange information using communication between processes (e.g., CORBA). Particularly, if the application unit 120 requests necessary network information to the connection manager 110 using communication between processes, the connection manager 110 determines whether it will provide network information, and may provide network information according to the result of the determination.

At this time, the connection manager 110 provides network information through communication between processes for the application which matches with user's accept or the policy. Basically, the connection manager 110 provides preset network information for each application of the application unit.

The connection manager 110 stores such network information in an encrypted shared pool. That is, the connection manager 110 encrypts network information, and stores the network information in a memory or a hard disk drive.

In addition, in case the connection manager 110 determines whether it will provide network information, and, as a result of the examination, in case it is determined to provide network information, only a user application having a correct decryption key can receive corresponding information. That is, the application can have a correct decryption key only for preset network information.

The operator 200 basically provides an interface for connecting a terminal to a core network (not shown) or a contents provider, and includes a base station 210 and a gateway 220. At this time, the operator can be an access service network including a base station and a gateway, and the gateway can be an ASN-GW (access service network gateway).

The contents provider 300 is an entity that provides contents to a terminal, and provides contents to a terminal through the operator 200.

Hereinafter, a method of providing a wireless data service according to an exemplary embodiment of the present invention will be explained.

Figure 2:
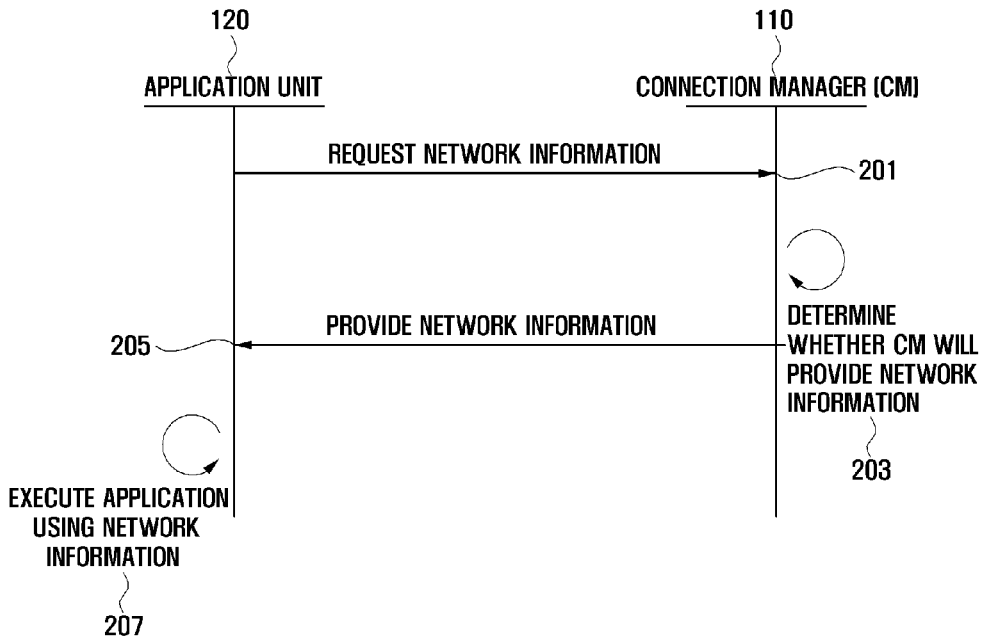
FIG. 2 is a flowchart illustrating a method of providing a wireless data communication service according to an exemplary embodiment of the present invention.

FIG. 2 is a flowchart illustrating a method of providing a wireless data communication service according to an exemplary embodiment of the present invention.

In FIG. 2, the communication between the connection manager 110 and the application unit 120 exchanges data through communication between processes, for example, performs communication through CORBA (common object request broker architecture). Here, the communication method between processes is not limited to the CORBA.

Referring to FIG. 2, the application unit 120 requests network information to the connection manager 110 (201). Then, the connection manager 110 determines whether it will provide corresponding network information to the application unit 120 (203). At this time, the connection manager 110 provides network information for the application which matches with user's accept or the policy by communication between processes. Basically, the connection manager 110 provides preset network information for each application of the application unit.

As a result of the determination at step 203, if it is determined that the CM will provide network information, the connection manager 110 provides network information to the application unit 120 (205).

The application unit 120 which received the network information performs a function using the received network information (207).

Further, as a result of the determination at step 203, if it is determined that the CM will not provide network information, the connection manager 110 performs an application without utilizing network information.

A method of providing a wireless data service for each application will be explained in more detail.

First, a method of providing a wireless data service, which uploads location-based user data, will be explained.

Figure 3:
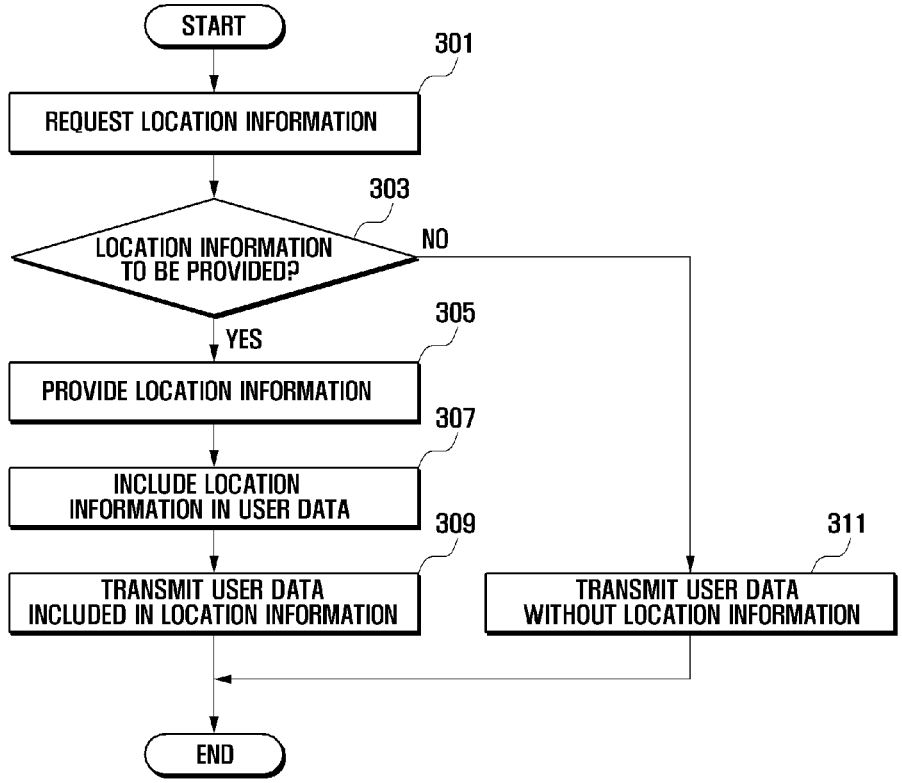
FIG. 3 is a flowchart illustrating a method of providing a wireless data communication service according to one exemplary embodiment of the present invention.

FIG. 3 is a flowchart illustrating a method of providing a wireless data communication service according to one exemplary embodiment of the present invention.

In FIG. 3, it is assumed that the application unit 120 is an application for uploading user data. For example, the application is a camera application, and the camera application has a photographing function and a function of uploading a photographed digital picture (user data) in a specific server.

Referring to FIG. 3, the application unit 120 requests location information among network information to the connection manager 110 (301).

The connection manager 110 determines whether it will provide location information which is network information to the application unit 120 (303). Such a determination process is the same as the process explained with reference to FIG. 2.

As a result of the determination at step 303, if it is determined that the connection manager 110 will provide location information, the connection manager 110 provides location information to the application unit 120 (305). Such location information can be an identifier (cell ID or BSID) of the currently connected base station. The base station identifier can be converted into information that indicates the location of the base station. That is, such location information of the base station can directly provide the currently connected cell ID (or BS ID) to the application, or can convert the ID into a physical location (GPS information or actual location such as Seoul and Suwon) and then provide the physical location to the application unit 120.

The application unit 120 which received the location information includes the location information in user data (307). For example, in case data for uploading is image data, the application unit 120 can include the location information into meta data of image data. In addition, data for uploading can be generated by connecting image data and location information by a link. At this time, in case cell ID (BS ID) is directly provided as location information, the application unit 120 can convert the ID into a physical location, and can include the physical location in user data.

Then, the application unit 120 transmits user data including location information to a corresponding contents provider 300 through the operator 200 (309). Here, in case the application performs a function of uploading a photograph, the contents provider 300 can be a website which makes photographs uploaded by users available to many unspecified people or members through web pages.

Further, as a result of the determination at step 303, if it is determined that the CM will not provide location information, the application unit 120 uploads user data without network information (location information) (311).

Hereinafter, a method of providing a wireless data service of an application which performs automatic authentication will be explained.

Figure 4:
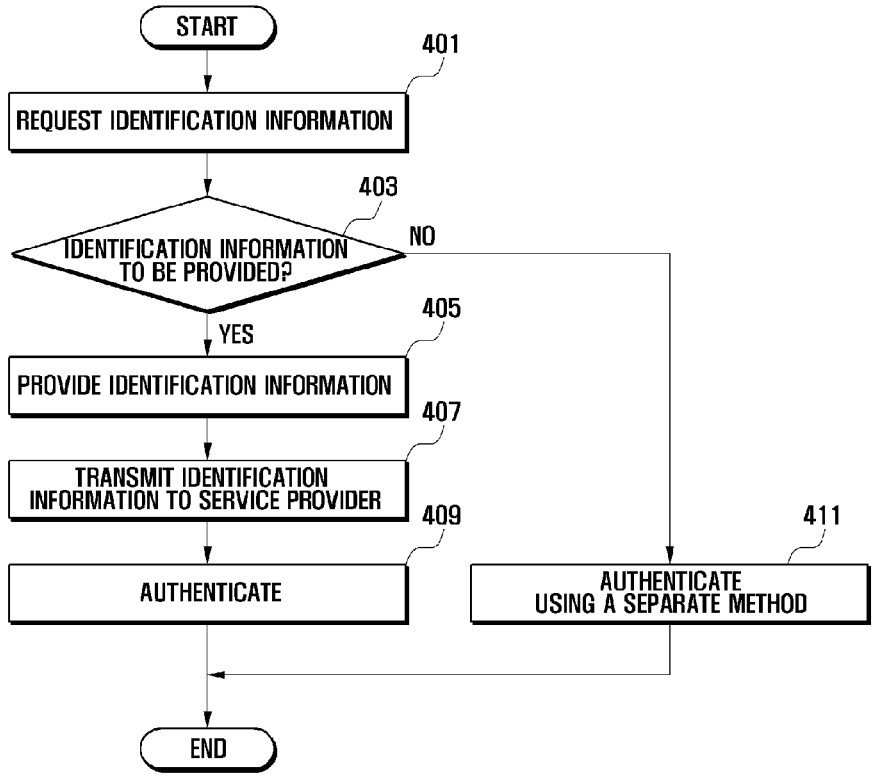
FIG. 4 is a flowchart illustrating a method of providing a wireless data communication service according to another exemplary embodiment of the present invention.

FIG. 4 is a flowchart illustrating a method of providing a wireless data communication service according to another exemplary embodiment of the present invention.

In FIG. 4, it is assumed that the application of an application unit 120 is an application that requires authentication. Such an application can be a contents player which plays DRM contents and a messenger or the like.

When performing an application, if a log-in or authentication is required, the application unit 120 requests identification information among network information (401). As explained above, such identification information includes IMEI(International Mobile Equipment Identity), IMSI(International Mobile Subscriber Identity), and TMSI(or TIMSI, Temporary IMSI) or the like. An exemplary embodiment which refers to FIG. 4 can use a subscriber identifier for identifying a subscriber such as IMSI and TMSI or the like.

The connection manager 110 determines whether it will provide an identifier which is network information to the application unit 120 (403). Such a determination process is the same as the process explained with reference to FIG. 2.

As a result of the determination at step 403, if it is determined that the CM will provide location information, the connection manager 110 provides identification information to the application unit 120 (405).

The application unit 120 which received identification information transmits the identification information to a contents provider 300 through an operator 200 (407).

The contents provider 300 checks such identification information from the operator 200, and then authenticates a terminal 100 and provides a service (409). For example, user can be authenticated by comparing identification information with corresponding service subscription information.

According to the present invention, the contents provider 300 performs authentication by verifying corresponding identification information in connection with an operator network. According to the present invention, an authentication certificate-based log-in effect can be provided by utilizing personal information, which is necessary for using contents, as wireless service subscription information.

Further, as a result of the determination at step 403, if it is determined that the CM will not provide identification information, the application unit 120 performs authentication using a separate method like the existing method (411). For example, authentication can be performed by a contents provider by directly inputting an ID and a password of a subscriber.

Hereinafter, a method of providing a wireless data communication service, which provides multimedia contents according to performance of a terminal and wireless data communication, will be explained.

Figure 5:
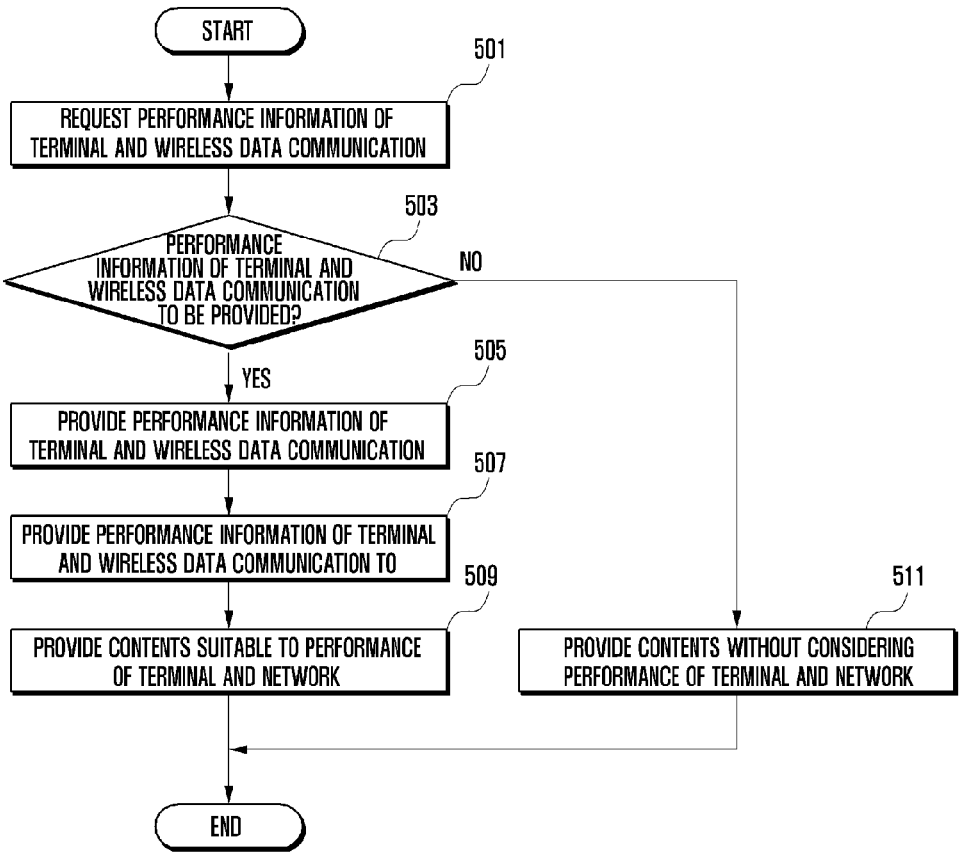
FIG. 5 is a flowchart illustrating a method of providing a wireless data communication service according to further another exemplary embodiment of the present invention.

FIG. 5 is a flowchart illustrating a method of providing a wireless data communication service according to further another exemplary embodiment of the present invention.

In FIG. 5, it is assumed that the application of an application unit 120 is an application which provides a service of playing multimedia contents. Multimedia contents can be a video, a sound source, and an audio file or the like. In FIG. 5, it is assumed that the application is a multimedia contents player which plays multimedia contents.

Referring to FIG. 5, it is assumed that a terminal attempts to use video contents. At this time, the connection manage (CM) 110 can periodically update performance information of a terminal and wireless data communication.

The application unit 120 requests performance information of a terminal and wireless data communication to the connection manager 110 (501).

Then, the CM 110 determines whether it will provide performance information of the terminal and wireless data communication to the application unit 120 (503). Such a determination process is the same as the process explained with reference to FIG. 2.

As a result of the determination at step 503, if it is determined that the CM 110 will provide performance information of the terminal and wireless data communication, the CM 110 provides performance information of the terminal and wireless data communication to the application unit 120 (505).

The application unit 120 which received performance information of the terminal and wireless data communication includes performance information of the terminal and wireless data communication in a request message which requests multimedia contents, and transmits the request message to a contents provider 300 (507).

The contents provider which received performance information of the terminal and wireless data communication transmits contents, whose quality is suitable to performance of the terminal and wireless data communication based on performance information, to the terminal (509). That is, appropriate contents in consideration of information such as calculation processing ability, resolution and graphic acceleration ability of the terminal and information such as bandwidth, RSSI, CINR and QoS are provided to the terminal. For example, the capacity of multimedia contents can be regulated according to the calculation processing ability, resolution, and graphic acceleration ability or the like, and the transmission rate of multimedia contents can be regulated according to bandwidth, RSSI, CINR, and QoS or the like.

At this time, in case performance of the data communication and the terminal is good, the contents provider 300 provides high-quality contents to the terminal 100. On the other hand, in case performance of the network and the terminal 100 is not good, the contents to be provided by the contents provider 300 is comparatively low-quality and light, so that contents which are optimal to the performance of the terminal and the wireless data communication can be provided.

According to the embodiment of the present invention, an optimal service which fits performance of a terminal and wireless data communication can be provided, and performance and efficiency about service provision and use are improved.

Further, as a result of the determination at step 503, if it is determined that the CM 110 will not provide performance information of a terminal and wireless data communication, the application unit 120 provides contents which do not consider performance of the terminal and wireless data communication (511).

As described above, when it becomes possible for network information that the CM 110 has to be provided to the application unit 120 in a unified manner, each application does not need to obtain network information or parameters in a different way though an operator network or a contents provider or through a different agent, but can utilize consistent network information provided by the connection manager 110, so that resources between the terminal 100 and the operator 200 can be saved, and user can solve the reluctance of installing a separate agent.

That is, according to the prior art, since an entity for providing network connection information to a user application was positioned in the operator 200, resources of the terminal 100 and the operator 200 were consumed in order that such connection information is provided to the application. However, the connection information is provided within the terminal 100, so that the resources between the terminal 100 and the operator 200 are not wasted, and the service can be provided faster than before.

In addition, when applying a service delivery platform (SDP) such as USI, OMA and Parlay, a parameter provided by a corresponding SDP can be provided to a user application in a manner according to an exemplary embodiment of the present invention. That is, the connection manager can also play a role of an agent of a client for these SDPs, and information that can be provided by the CM itself can be quickly obtained from the CM without obtaining from the SDP.

In addition, a location-based service using a base station identifier (cell ID), contents of quality (rich or light) which are suitable to the throughput of a terminal and data connection, and a single sign-on that utilizes a terminal or a subscriber identifier as a service certification in a network can be provided. Additionally, an application that utilizes network information can be implemented through a consistent interface, so that the application development time can be reduced.

The invention claimed is:

1. An apparatus for providing a wireless data communication service using Internet protocol, the apparatus comprising:
   a storage medium configured to store information;
   a transmitter configured to transmit wireless data communication;
   a receiver configured to receive wireless data communication; and
   a processor configured to:
      execute a connection manager (CM) to:
         periodically receive network information from a base station,
         update and store the received network information in the storage medium, and
         provide an application unit with network information preset for each application, wherein the network information preset for the each application is a subset of the received network information, and
      execute the application unit to perform a function of the each application using the provided network information preset for the each application,
   wherein the connection manager determines whether to provide the network information preset for the each application to the application unit according to the each application.

2. The apparatus of claim 1, wherein the network information includes a base station identifier, location information which converted the base station identifier, identification information for identifying a subscriber or a subscriber terminal, and performance information which indicates performance of a terminal and a wireless communication network.

3. The apparatus of claim 2, wherein the application unit includes the location information in user data and uploads the user data, in case the application performs a function of uploading the user data.

4. The apparatus of claim 2, wherein the application unit performs an authentication procedure using the identifier information, in case the application is an application that requires an authentication procedure.

5. The apparatus of claim 2, wherein the application unit transmits the performance information to a contents provider and receives and plays multimedia contents of a quality corresponding to the transmitted performance information, in case the application provides a service of playing multimedia contents.

6. A method of providing a wireless data communication service using Internet protocol, the method comprising:
   periodically receiving network information from a base station;
   extracting network information preset for each application, wherein the network information preset for the each application is a subset of the received network information that is updated and stored by a connection manager;
   determining whether to provide the network information preset for the each application to an application unit according to the each application by the connection manager;
   providing an application unit with the network information preset for the each application by the connection manager, if the connection manager determines to provide the network information; and performing an application function according to the each application using the provided network information preset for the each application by the application unit.

7. The method of claim 6, wherein the network information includes a base station identifier, location information which converted the base station identifier, identification information for identifying a subscriber or a subscriber terminal, and performance information which indicates performance of a terminal and a wireless communication network.

8. The method of claim 7, wherein the performing of the application function comprises including the location information in user data, and uploading the user data, in case user data is uploaded.

9. The method of claim 7, wherein the performing of the application function comprises performing an authentication procedure using the identification information, in case the authentication procedure is performed.

10. The method of claim 7, wherein the performing of the application function comprises transmitting the performance information to a contents provider, and receiving and playing multimedia contents of a quality corresponding to the transmitted performance information, when the multimedia contents is received and played.

\* \* \* \* \*